US012583382B2

(12) United States Patent
Wood et al.

(10) Patent No.: US 12,583,382 B2
(45) Date of Patent: Mar. 24, 2026

(54) SYNCHRONIZED LIGHTING FOR ELECTRIC VEHICLES

(71) Applicant: Rivian IP Holdings, LLC, Irvine, CA (US)

(72) Inventors: Eric Ross Baker Wood, Menlo Park, CA (US); Christopher Marshall Jacobs, Palo Alto, CA (US); Nicholas Kalayjian, Redwood City, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 249 days.

(21) Appl. No.: 18/459,313

(22) Filed: Aug. 31, 2023

(65) Prior Publication Data

US 2025/0074299 A1 Mar. 6, 2025

(51) Int. Cl.
B60Q 1/50 (2006.01)
B60L 53/66 (2019.01)
G07C 5/00 (2006.01)
G07C 5/08 (2006.01)

(52) U.S. Cl.
CPC .............. B60Q 1/543 (2022.05); B60L 53/66 (2019.02); G07C 5/008 (2013.01); G07C 5/0825 (2013.01)

(58) Field of Classification Search
CPC ....... B60Q 1/543; B60L 53/66; B60L 53/305; B60L 2240/80; G07C 5/008; G07C 5/0825
USPC ........................................................ 701/31.4
See application file for complete search history.

(56) References Cited

U.S. PATENT DOCUMENTS

| | | | | |
|---|---|---|---|---|
| 9,818,268 | B2 * | 11/2017 | Muntada Roura ..... | B60Q 1/543 |
| 2009/0021364 | A1 * | 1/2009 | Frey ........................ | B60L 53/16 |
| | | | | 340/636.2 |
| 2012/0212320 | A1 | 8/2012 | Oberholtzer | |
| 2014/0097758 | A1 * | 4/2014 | Recker ................... | H05B 47/10 |
| | | | | 315/297 |
| 2017/0101025 | A1 * | 4/2017 | Penilla ................. | G06Q 20/102 |
| 2017/0240060 | A1 * | 8/2017 | Roberts ................ | B60Q 1/0076 |

(Continued)

OTHER PUBLICATIONS

P. R. Borah, D. Chatterjee and A. Baruah, "Smart Streetlight with Power Vending Scheme," 2019 2nd International Conference on Power Energy, Environment and Intelligent Control (PEEIC), Greater Noida, India, 2019, pp. 238-242, doi: 10.1109/PEEIC47157.2019. 8976585. (Year: 2019).*

(Continued)

*Primary Examiner* — Helal A Algahaim
*Assistant Examiner* — Merritt E Levy
(74) *Attorney, Agent, or Firm* — Patterson + Sheridan, LLP

(57) ABSTRACT

Systems and methods for synchronizing charge status lights between electric vehicles (EVs) and EV charging stations are provided. One method includes establishing a communication link between a charging station control system and an electric vehicle coupled to a charging station. The method further includes receiving, from the charging station control system, a charge status light pattern configured to control operation of one or more charge status lights on the electric vehicle and one or more charge status lights on the charging station. The method further includes receiving a wireless time signal, and generating a synchronization time signal based on the wireless time signal. The method further includes controlling, based on the synchronization time signal and the charge status light pattern, operation of the charge status lights on the electric vehicle.

20 Claims, 7 Drawing Sheets

(56)         References Cited

U.S. PATENT DOCUMENTS

2020/0005564 A1*   1/2020   Coburn ................ H05B 47/105
2022/0051492 A1*   2/2022   Badger, II ................ B60Q 1/50
2022/0063432 A1*   3/2022   Mercer ................... B60L 53/14
2025/0033507 A1*   1/2025   Yamazaki ........ H04N 21/41422
2025/0054344 A1*   2/2025   Sharma ................. B60Q 1/543
2025/0065738 A1*   2/2025   Haspiel ................... B60L 53/18

OTHER PUBLICATIONS

MaoShan Niu, et al, "Smart Indication for EV Charging Infrastructure," 2020, the IP.com Journal, China, 2020, IPCOM000261678D (Year: 2020).*

* cited by examiner

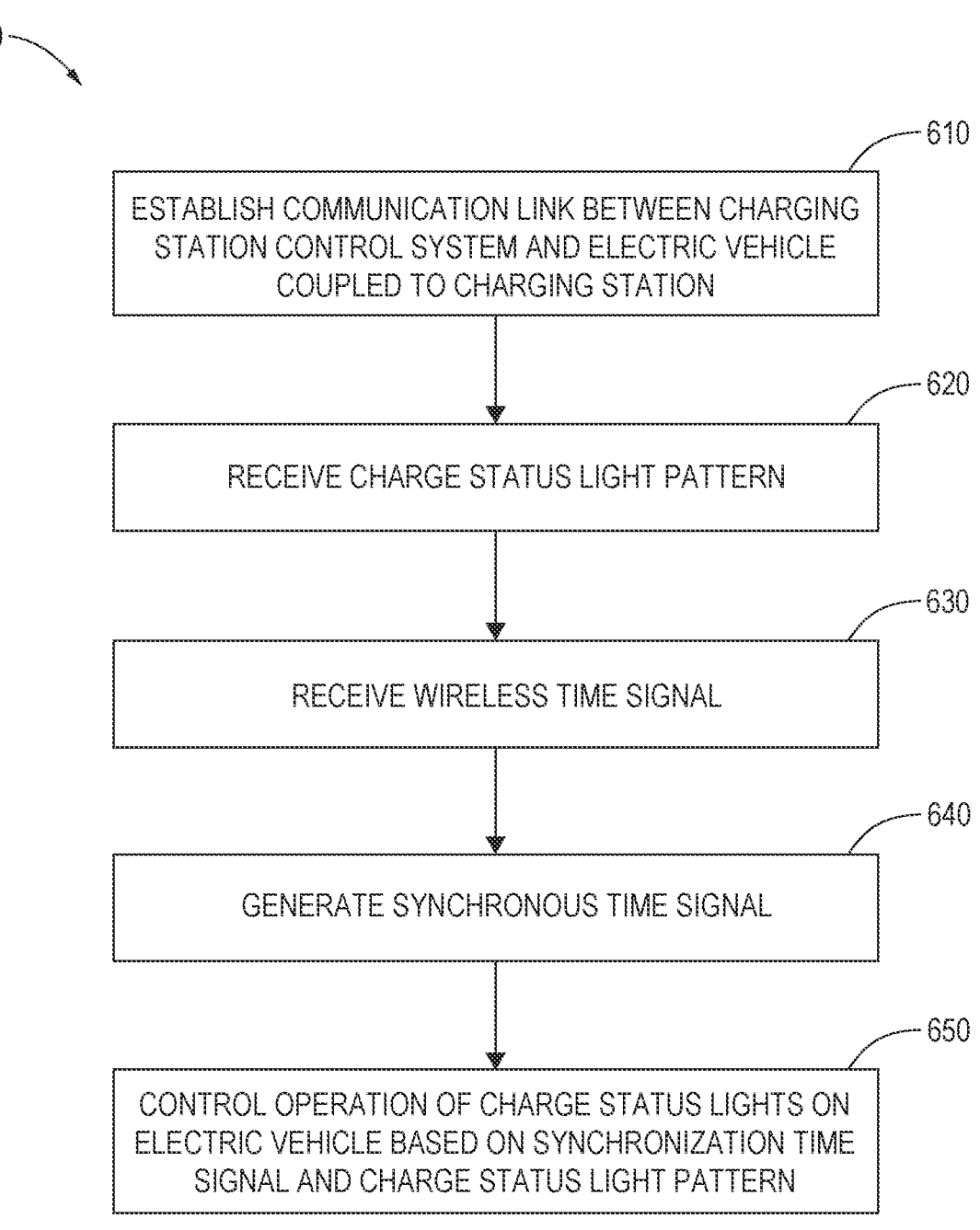

600

610

ESTABLISH COMMUNICATION LINK BETWEEN CHARGING STATION CONTROL SYSTEM AND ELECTRIC VEHICLE COUPLED TO CHARGING STATION

620

RECEIVE CHARGE STATUS LIGHT PATTERN

630

RECEIVE WIRELESS TIME SIGNAL

640

GENERATE SYNCHRONOUS TIME SIGNAL

650

CONTROL OPERATION OF CHARGE STATUS LIGHTS ON ELECTRIC VEHICLE BASED ON SYNCHRONIZATION TIME SIGNAL AND CHARGE STATUS LIGHT PATTERN

FIG. 6

SYNCHRONIZED LIGHTING FOR ELECTRIC VEHICLES

INTRODUCTION

The present disclosure relates to electric vehicles (EVs). More particularly, the present disclosure relates to synchronizing charge status lights between electric vehicles and EV charging stations.

SUMMARY

Embodiments of the present disclosure advantageously provide systems and methods for synchronizing charge status lights between electric vehicles and EV charging stations. One method includes establishing a communication link between a charging station control system and an electric vehicle coupled to a charging station. The method further includes receiving, from the charging station control system, a charge status light pattern configured to control operation of one or more charge status lights on the electric vehicle and one or more charge status lights on the charging station; receiving a wireless time signal. The method also includes generating a synchronization time signal based on the wireless time signal. The method further includes controlling, based on the synchronization time signal and the charge status light pattern, operation of the charge status lights on the electric vehicle.

BRIEF DESCRIPTION OF THE DRAWINGS

FIG. 6 depicts a flow chart representing functionality associated with synchronizing charge status lights, in accordance with embodiments of the present disclosure.

DETAILED DESCRIPTION

Figure 1:
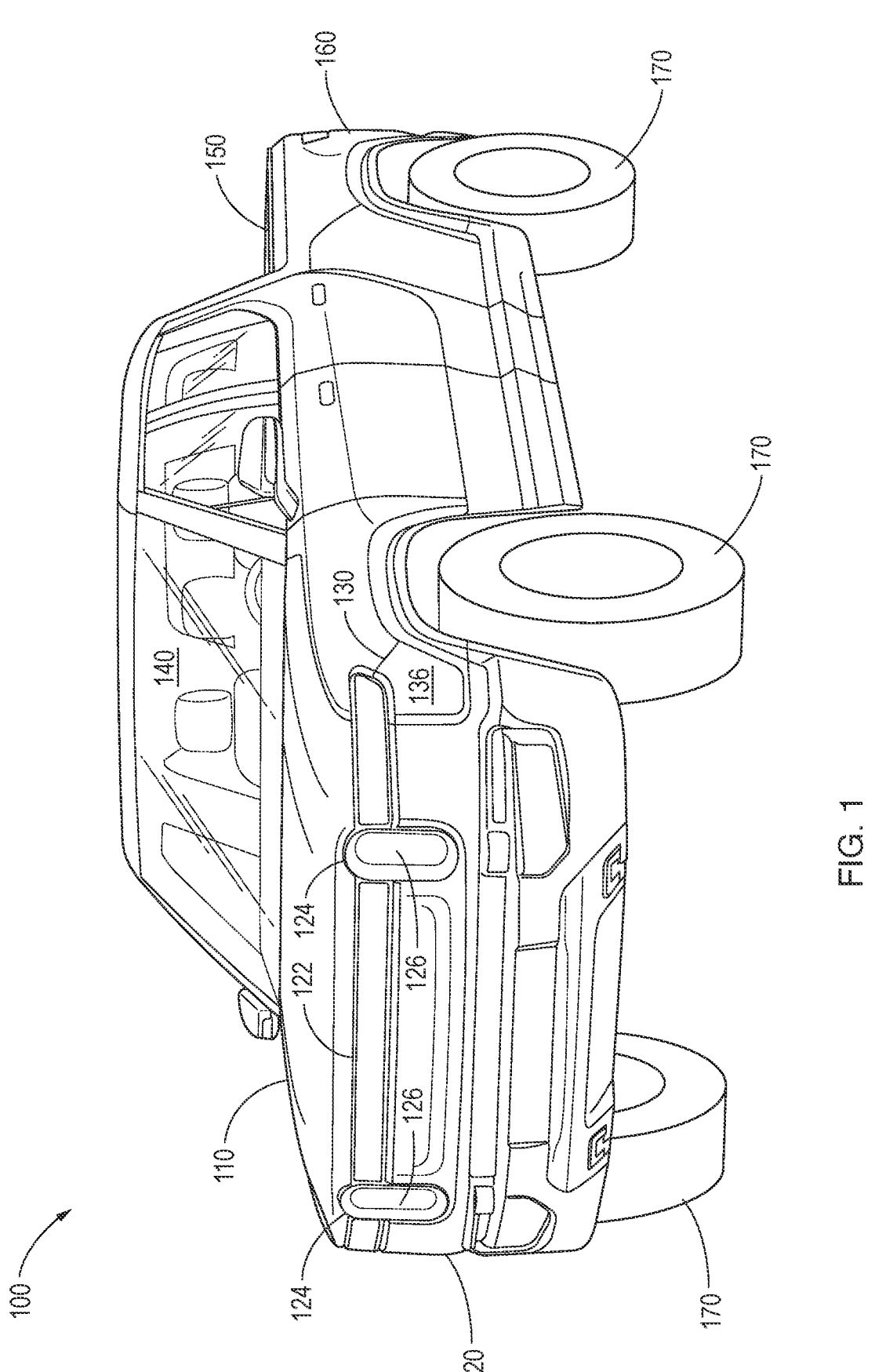
FIG. 1 depicts a diagram of an example electric vehicle, in accordance with embodiments of the present disclosure.

FIG. 1 depicts a diagram of electric vehicle 100, in accordance with embodiments of the present disclosure.

Electric vehicle 100 includes, inter alia, a frame and body 110, a propulsion system, a suspension system, a steering system, auxiliary and accessory systems (such as thermal management, electrical power distribution, lighting, wireless communications, navigation, etc.), etc.

Generally, body 110 may be directly or indirectly mounted to a frame (i.e., body-on-frame construction), or body 110 may be formed integrally with a frame (i.e., unibody construction). Body 110 includes, inter alia, front end 120, front light bar 122, stadium light ring 124, headlights 126, charging port 130 with charging port cover 136 concealing charging port light 132 and charging connector socket 134 (see FIGS. 2A, 2B, 3), driver/passenger compartment or cabin 140, bed 150, rear end 160 with a rear light bar (see FIGS. 2A, 2B), etc. Electric vehicle 100 may be a pickup truck, a sport utility vehicle (SUV) in which bed 150 is replaced by an extension of cabin 140, or a sedan in which bed 150 is replaced by a trunk. In certain embodiments, electric vehicle may be an electric delivery vehicle, an electric cargo van, etc.

The propulsion system may include, inter alia, one or more electronic control units (ECUs), one, two or four (or more) electric motors with associated drivetrains, wheels 170, an energy storage subsystem, etc. The energy storage subsystem may include, inter alia, one or more ECUs, a battery pack including one or more battery modules, a vehicle charging subsystem including charging port 130, etc.

An EV charging location has a number of EV charging stations, and each EV charging station services at least one electric vehicle. Each EV charging station has one (or more) charge status light(s) that operate (e.g., turn on, change color, etc.) when an electric vehicle is connected to the EV charging station and is receiving a charge. Similarly, many electric vehicles have a charge status light that surrounds the charging port socket and operates (e.g., turns on, changes color, etc.) when the electric vehicle is connected to an EV charging station and is receiving a charge. Some electric vehicles may have additional lights, such as a light bar on the front of the vehicle, a light bar on the rear of the electric vehicle, etc., that also operate (e.g., turn on, change color, etc.) when the electric vehicle is connected to the EV charging station and is receiving a charge.

In many electric vehicles and EV charging stations, the charge status lights may turn on and off periodically, such as every second, every two seconds, etc., when the electric vehicle is receiving a charge. Because the electric vehicle charge status lights and the EV charging station charge status lights are controlled by systems that operate using different time references, the charge status lights of the electric vehicles and the EV charging stations are turning on and off at different times and, quite likely, with different durations. The resulting cacophony of light that occurs when a large EV charging location is filled with charging electric vehicles is problematic and less than aesthetically pleasing.

Embodiments of the present disclosure advantageously synchronize the charge status lights of each electric vehicle and each EV charging station at an EV charging location, thereby providing a very pleasing and harmonious environment.

In certain embodiments, the synchronization of the charge status lights of the electric vehicles and the EV charging stations may be provided by a common time reference and charge status light pattern data.

Figures 2A, 2B:
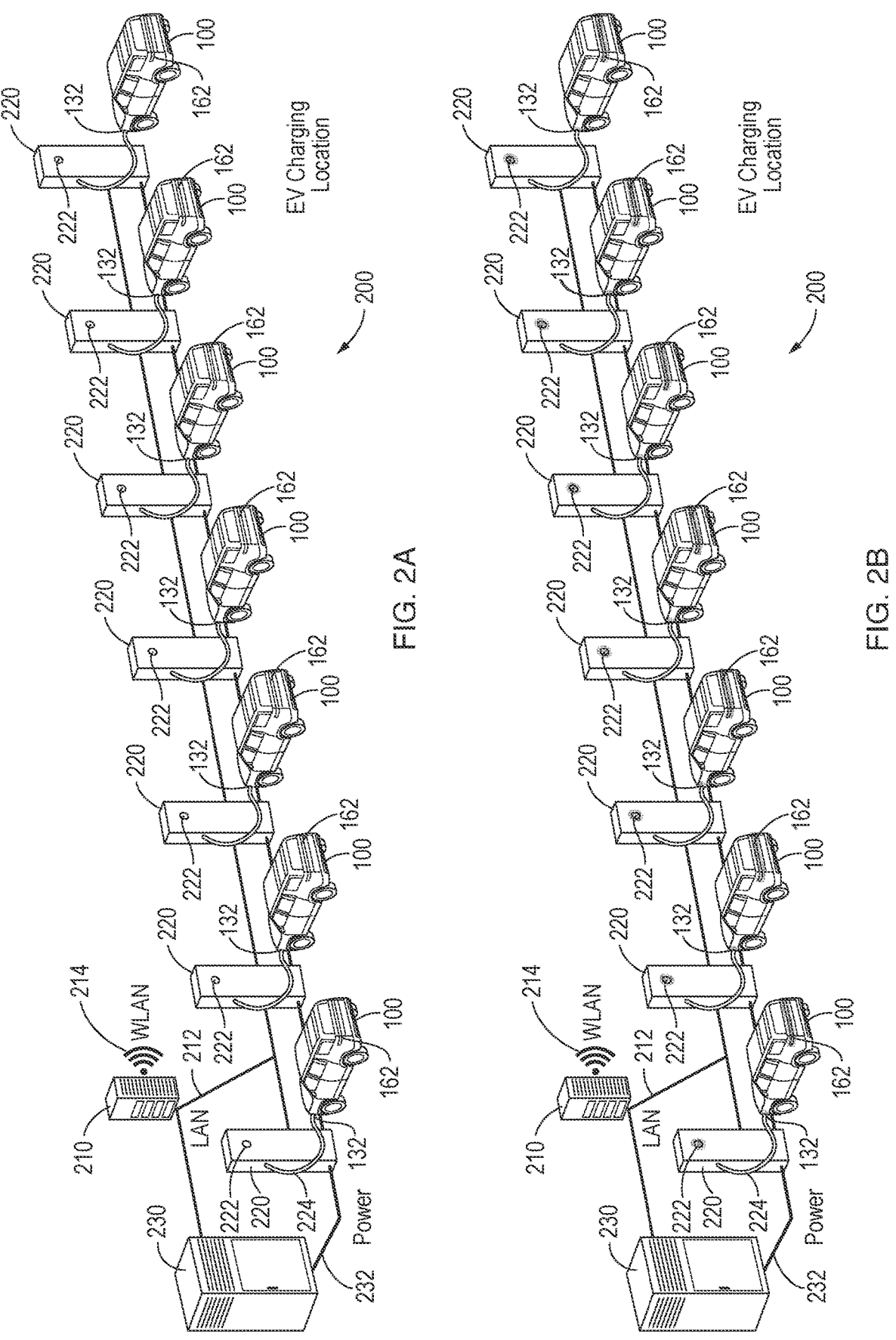
FIGS. 2A and 2B illustrate example electric vehicles at an example EV charging location, in accordance with embodiments of the present disclosure.

FIGS. 2A and 2B illustrate electric vehicles 100 at EV charging location 200, in accordance with embodiments of the present disclosure.

In certain embodiments, EV charging location 200 includes, inter alia, EV charging station control system 210, EV charging stations 220, and power conversion station 230.

More particularly, FIGS. 2A, 2B depict seven (7) electric vehicles 100 being charged at the same time. Each electric vehicle 100 is connected to a respective EV charging station 220 using a respective EV charging connector 224. FIG. 2A depicts an example charge status light pattern at EV charging location 200 at a particular (first) point in time. Charge status lights 222 of EV charging stations 220, as well as charging port lights 132, front light bars 122 (not visible) and rear light bars 162 of electric vehicles 100, are all turned off at this (first) point in time. FIG. 2B depicts the same charge status light pattern at EV charging location 200 at a different (second) point in time. Charge status lights 222, charging port lights 132, front light bars 122 (not visible) and rear light bars 162 are all turned on at this (second) point in time.

In certain embodiments, EV charging station control system 210 may include, inter alia, a computer coupled directly or indirectly to one or more networks, such as a LAN, a WAN, the Internet, etc. The computer may include, inter alia, a bus coupled to one or more processors, one or more storage elements or memories, one or more communication interfaces (such as Ethernet, WiFi, Bluetooth, etc.), one or more wireless time signal receivers (such as a global navigation satellite system receiver, a time standard radio transmission receiver, etc.), and one or more I/O interfaces. Generally, the communication interfaces may be coupled to the networks using wired or wireless connections, and the I/O interfaces may be coupled to I/O devices using wired or wireless connections.

The processors may include one or more general-purpose or application-specific microprocessors that execute instructions to perform control, computation, input/output, etc. functions for the computer. Each processor may include a single integrated circuit, such as a micro-processing device, or multiple integrated circuit devices and/or circuit boards working in cooperation to accomplish the appropriate functionality. In addition, the processors may execute computer programs or modules, such as an operating system, software modules, etc., stored within the memory.

In certain embodiments, each EV charging station 220 may include, inter alia, a processor or microcontroller coupled to one or more communication interfaces (such as Ethernet, WiFi, Bluetooth, etc.), charge status light 222, EV charging connector 224, and power delivery circuitry. Generally, the communication interfaces may be coupled to a local network, such as a LAN, a WLAN, etc., using wired or wireless connections, and the power delivery circuitry may be coupled to power conversion station 230.

Generally, EV charging station control system 210 manages the power distribution from one or more power conversion stations 230 to EV charging stations 220, communicates with EV charging stations 220 via a wired communication link (such as Ethernet, etc.) or a wireless communication link (such as WiFi, Bluetooth, etc.), and communicates with electric vehicles 100 via a wireless communication link (such as WiFi, Bluetooth, etc.) or a wired communication link (such as the control pilot signal line of EV charging connector 224 provided by each EV charging station 220), etc. In certain embodiments, EV charging station control system 210 may be connected to EV charging stations 220 and power conversion station 230 over local area network (LAN) 212 using Ethernet, and EV charging station control system 210 may be connected to electric vehicles 100 over a wireless LAN (WLAN) 214 using WiFi.

During charging, each EV charging station 220 may be coupled to an electric vehicle 100 using EV charging connector 224, which includes a handle with a plug that mates with charging connector socket 134 of charging port 130. In certain embodiments, the plug and charging connector socket 134 include respective mating connectors for a number of lines, such as ground, proximity pilot signal, control pilot signal, DC (AC) line 1, DC (AC) line 2, etc.

Power conversion station 230 is coupled to the power grid. In certain embodiments, each power conversion station 230 performs AC-DC and DC-DC power conversion for one or more EV charging stations 220.

For example, power conversion station 230 may include seven (7) power electronics modules that each provide 50 kW DC supply individually or 350 kW DC supply when electronically coupled together. Accordingly, one power conversion station 230 may simultaneously provide 50 kW DC supply to seven (7) EV charging stations 220 (as depicted in FIGS. 2A, 2B), or, alternatively, seven (7) power conversion stations 230 may provide 350 KW DC supply to seven (7) respective EV charging stations 220. Different numbers of power conversion stations 230, different numbers and capacity of power electronic modules in each power conversion station 230, etc., are also contemplated. In some certain embodiments, each power conversion station 230 may provide an AC supply to electric vehicle 100, which converts the AC supply to a DC supply onboard to charge the battery pack.

In some certain embodiments, EV charging station control system 210 may be housed within, or combined with, one of the power conversion stations 230. For example, the computer system bus may be coupled to an expansion bus chassis in which the power electronic modules are housed, thereby simplifying communication and packaging requirements for EV charging station control system 210 and power conversion station 230.

Figure 2C:
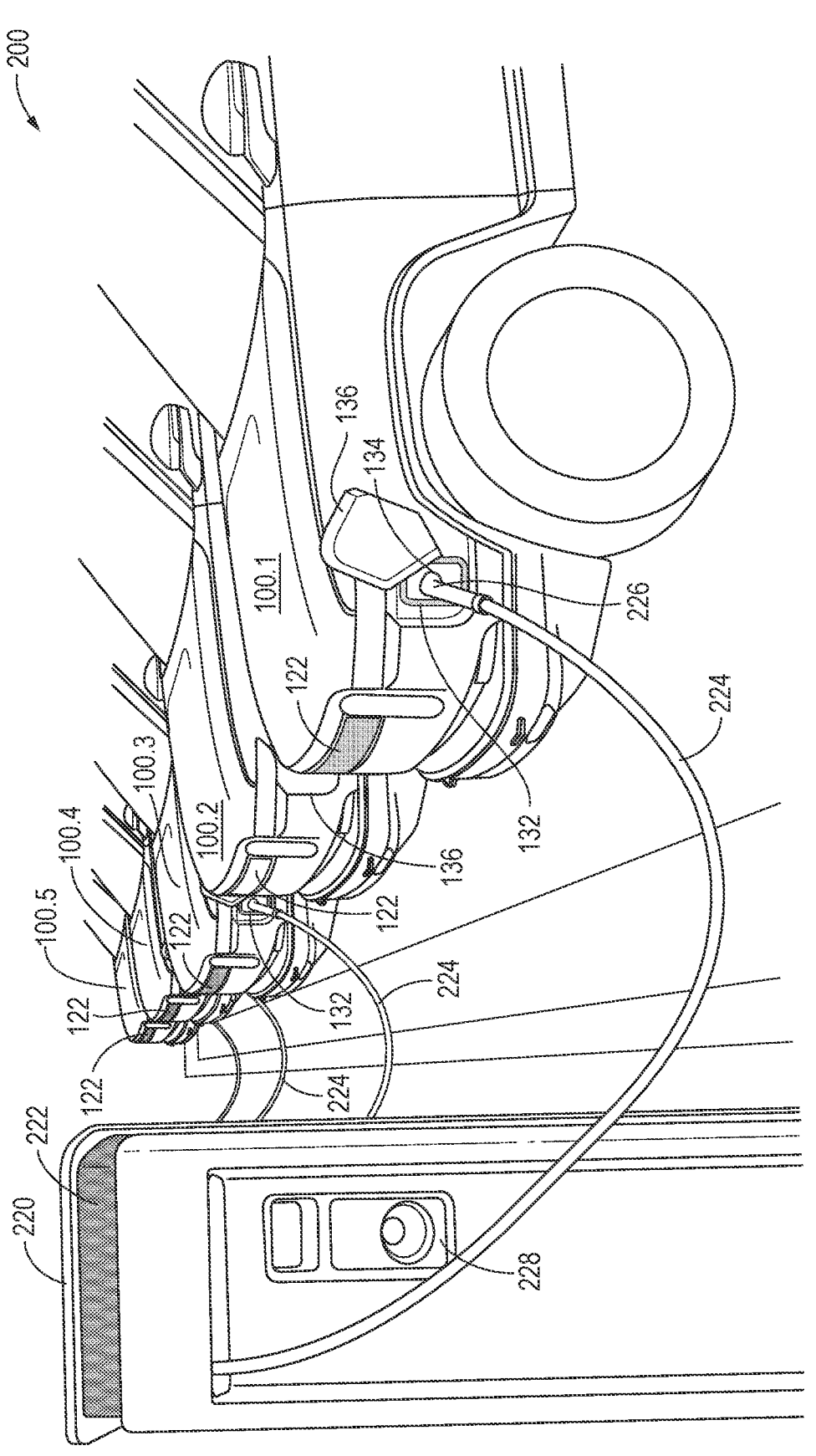
FIG. 2C illustrates a different view of example electric vehicles at the example EV charging location, in accordance with embodiments of the present disclosure.

FIG. 2C illustrates a different view of electric vehicles 100 at EV charging location 200, in accordance with embodiments of the present disclosure.

Rather than seven electric vehicles 100, FIG. 2C depicts five electric vehicles 100.1, 100.2, 100.3, 100.4, 100.5 at EV charging location 200. Four electric vehicles 100.1, 100.3, 100.4, 100.5 are connected to, and receiving a charge from, respective EV charging stations 220 using EV charging connectors 224. More particularly, as seen with respect to electric vehicle 100.1, charging port cover 136 is open, and EV charging connector plug 226 is coupled to charging connector socket 134. In contrast to FIGS. 2A, 2B, electric vehicle 100.2 is not connected to an EV charging station 220, and EV charging connector plug 226 is stowed within connector receptacle 228 of the respective EV charging station 220 (not visible).

FIG. 2C depicts the same the same charge status light pattern as FIG. 2B at the same point in time (i.e., the second point in time). Charging port lights 132, front light bars 122 and rear light bars 162 (not visible) for electric vehicles 100.1, 100.3, 100.4, 100.5, as well as charge status lights 222 for the respective EV charging stations 220, are all turned on at this time. However, because electric vehicle 100.2 is not connected to, and is not receiving a charge from, a respective EV charging station 220, charging port light 132, front light bar 122 and rear light bar 162 (not visible) for electric vehicle 100.2 are all turned off.

As noted above, in certain embodiments, the synchronization of the charge status lights of electric vehicles 100 and EV charging stations 220 may be provided by a common time reference and charge status light pattern data.

Generally, the common time reference may be a wireless time signal provided by a global navigation satellite system, such as GPS, Galileo, etc., a time standard radio transmission broadcast by a national physics laboratory, such as the WWVB signal by NIST (US), the MSF signal by NPL (UK), etc., or a similar wireless time signal.

In certain embodiments, EV charging station control system 210 may receive the wireless time signal using a wireless time signal receiver (such as a GPS receiver, etc.), and distribute a synchronization time signal to each EV charging station 220 via a wired or wireless communication link. In some certain embodiments, each EV charging station 220 may include a wireless time signal receiver (such as a GPS receiver, etc.) to receive the wireless time signal, and a microprocessor or microcontroller to generate a synchronization time signal. Similarly, each electric vehicle 100 may include a wireless time signal receiver (such as a GPS receiver, etc.) to receive the wireless time signal, and a control system to generate a synchronization time signal.

Generally, the synchronization time signal(s) for EV charging stations 220 and the synchronization time signal for each electric vehicle 100 are repeating signals that are generated from the common wireless time signal, and may be used to control when the charge status light pattern is repeatedly displayed by the charge status lights of EV charging stations 220 and electric vehicles 100. In other words, the operation of the charge status lights of EV charging stations 220 and electric vehicles 100 are controlled based on the synchronization time signal and the charge status light pattern data.

In some certain embodiments, EV charging station control system 210 may generate and provide the common time reference to EV charging stations 220 and electric vehicles 100. The common time reference may be provided to each EV charging station 220 via a wired communication link (such as Ethernet, etc.) or a wireless communication link (such as WiFi, Bluetooth, etc.). Similarly, the common time reference may be provided to each electric vehicle 100 via a wired connection from a respective EV charging station 220 (such as the control pilot signal line of EV charging connector 224, etc.) or a wireless communication link (such as WiFi, Bluetooth, etc.).

In certain embodiments, EV charging station control system 210 may provide the charge status light pattern data to EV charging stations 220 and electric vehicles 100 via a wired or wireless communications link. For example, the charge status light pattern data may be provided to EV charging stations 220 via a wired communication link (such as Ethernet, etc.) or a wireless communication link (such as WiFi, Bluetooth, etc.). Similarly, the charge status light pattern data may be provided to each electric vehicle 100 via a wired connection from a respective EV charging station 220 (such as the control pilot signal line of EV charging connector 224, etc.) or a wireless communication link (such as WiFi, Bluetooth, etc.).

Generally, the charge status light pattern data may define the cycling, pulsating, growing and fading, flashing, blinking, etc., of the charge status lights of EV charging stations 220 and electric vehicles 100 using one or more parameters, such as a rhythm, a cadence, etc. In certain embodiments, the rhythm, cadence, etc. may be defined by a charge status light pattern time period or duration (in seconds) that is divided into a sequence of time steps, and a charge status light intensity level (such as a percentage of full illumination) for each time step.

Figure 3:
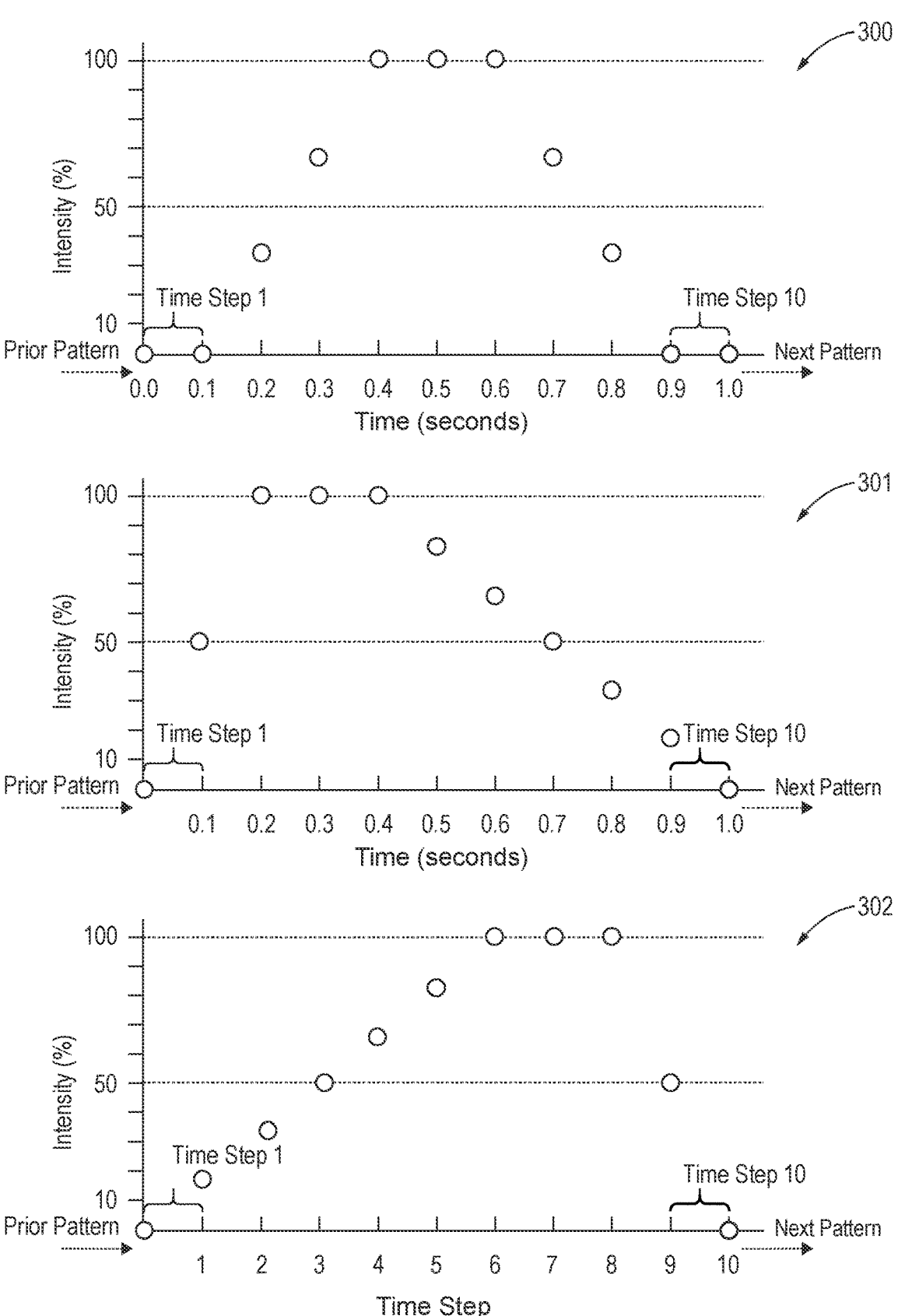
FIG. 3 presents diagrams of example charge status light patterns, in accordance with embodiments of the present disclosure.

FIG. 3 presents diagrams of charge status light patterns 300, 301, 302, in accordance with embodiments of the present disclosure.

Charge status light pattern 300 has a duration of 1 second that is divided into 10 time steps, and defines the following charge status light intensity levels: 0% intensity during time step 1 (e.g., 0.0 seconds to 0.1 seconds), gradual rise to 33% intensity during time step 2 (e.g., 0.1 seconds to 0.2 seconds), gradual rise to 66% intensity during time step 3 (e.g., 0.2 seconds to 0.3 seconds), gradual rise to 100% intensity during time step 4 (e.g., 0.3 seconds to 0.4 seconds), remain at 100% intensity during time steps 5 and 6 (e.g., 0.4 seconds to 0.6 seconds), gradual fall to 66% intensity during time step 7 (e.g., 0.6 seconds to 0.7 seconds), gradual fall to 33% intensity during time step 8 (e.g., 0.7 seconds to 0.8 seconds), gradual fall to 0% intensity during time step 9 (e.g., 0.8 seconds to 0.9 seconds), and remain at 0% intensity during time step 10 (e.g., 0.9 seconds to 1.0 seconds). For example, time steps 1 and 10 (0% intensity) of charge status light pattern 300 may correspond to the charge status light intensities depicted in FIG. 2A, while time steps 5 and 6 (100% intensity) of charge status light pattern 300 may correspond to the charge status light intensities depicted in FIG. 2B.

Charge status light pattern 301 has a duration of 1 second that is divided into 10 time steps, and defines the following charge status light intensity levels: rise to 50% intensity during time step 1 (e.g., 0.0 seconds to 0.1 seconds), rise to 100% intensity during time step 2 (e.g., 0.1 seconds to 0.2 seconds), remain at 100% intensity during time steps 3 and 4 (e.g., 0.2 seconds to 0.4 seconds), gradual fall to 83% intensity during time step 5 (e.g., 0.4 seconds to 0.5 seconds), gradual fall to 66% intensity during time step 6 (e.g., 0.5 seconds to 0.6 seconds), gradual fall to 50% intensity during time step 7 (e.g., 0.6 seconds to 0.7 seconds), gradual fall to 33% intensity during time step 8 (e.g., 0.7 seconds to 0.8 seconds), gradual fall to 17% intensity during time step 9 (e.g., 0.8 seconds to 0.9 seconds), gradual fall to 0% intensity during time step 10 (e.g., 0.9 seconds to 1.0 seconds). For example, the beginning of time step 1 and the end of time step 10 (0% intensity) of charge status light pattern 301 may correspond to the charge status light intensities depicted in FIG. 2A, while time steps 3 and 4 (100% intensity) of charge status light pattern 301 may correspond to the charge status light intensities depicted in FIG. 2B.

Charge status light pattern 302 has a duration of 1 second that is divided into 10 time steps, and defines the following charge status light intensity levels: gradual rise to 17% intensity during time step 1 (e.g., 0.0 seconds to 0.1 seconds), gradual rise to 33% intensity during time step 2 (e.g., 0.1 seconds to 0.2 seconds), gradual rise to 50% intensity during time step 3 (e.g., 0.2 seconds to 0.3 seconds), gradual rise to 66% intensity during time step 4 (e.g., 0.3 seconds to 0.4 seconds), gradual rise to 83% intensity during time step 5 (e.g., 0.4 seconds to 0.5 seconds), gradual rise to 100% intensity during time step 6 (e.g., 0.5 seconds to 0.6 seconds), remain at 100% intensity during time steps 7 and 8 (e.g., 0.6 seconds to 0.8 seconds), fall to 50% intensity during time step 9 (e.g., 0.8 seconds to 0.9 seconds), fall to 0% intensity during time step 10 (e.g., 0.9 seconds to 1.0 seconds). For example, the beginning of time step 1 and the end of time step 10 (0% intensity) of charge status light pattern 302 may correspond to the charge status light intensities depicted in FIG. 2A, while time steps 7 and 8 (100% intensity) of charge status light pattern 302 may correspond to the charge status light intensities depicted in FIG. 2B.

Other charge status light patterns are also contemplated, such as charge status light patterns that have durations other than 1 second (such as 0.5 seconds, 1.5 seconds, 2 seconds, 2.5 seconds, 3.0 seconds, etc.), durations between 0.5 seconds and 3.0 seconds, different time steps (5 time steps, 15 time steps, etc.), different minimum and maximum intensity levels (20% and 80% respectively, 33% and 95% respectively, etc.), etc.

Figure 4:
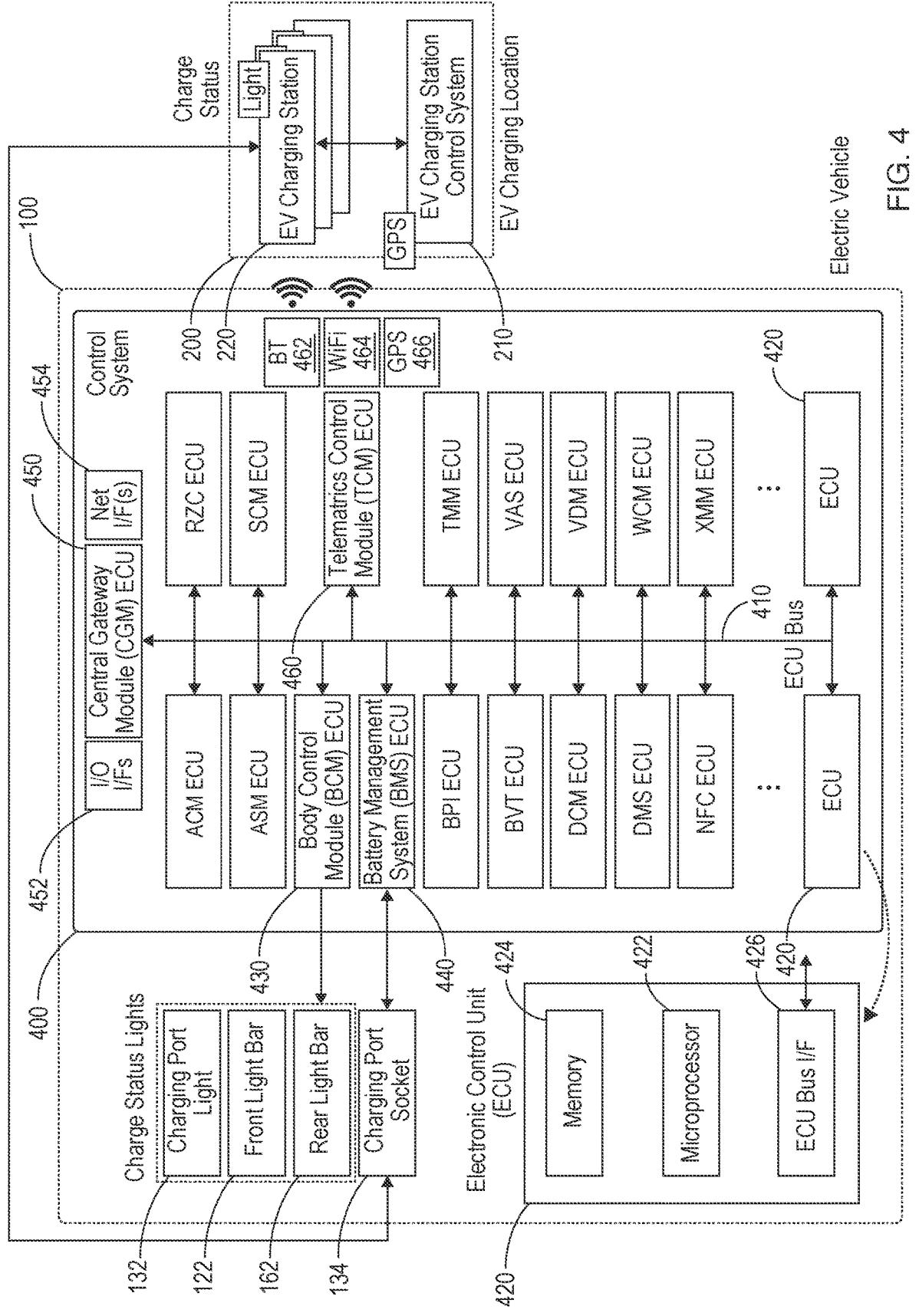
FIG. 4 presents a block diagram of example components of an electric vehicle and an EV charging location, in accordance with embodiments of the present disclosure.

FIG. 4 presents a block diagram of example components of electric vehicle 100 and EV charging location 200, in accordance with embodiments of the present disclosure.

EV charging location 200 includes, inter alia, EV charging station control system 210 and EV charging stations 220 (see FIGS. 2A, 2B).

Generally, electric vehicle 100 includes control system 400 that is configured to perform the functions necessary to operate electric vehicle 100. In certain embodiments, control system 400 includes a number of electronic control units (ECUs) 420 coupled to ECU Bus 410 (also known as a controller area network or CAN). Each ECU 420 performs a particular set of functions, and includes, inter alia, microprocessor 422 coupled to memory 424 and ECU Bus I/F 426. In certain embodiments, control system 400 may include a number of system-on-chips (SOCs). Each SOC may include a number of multi-core processors coupled to a high-speed interconnect and on-chip memory that provide more robust functionality and performance than a single ECU 420. Accordingly, each SOC may combine the functionality provided by several ECUs 420.

Control system 400 may be coupled to input/output (I/O) devices, as well as other components within the propulsion system, the suspension system, the steering system, the auxiliary and accessory systems, etc., such as charging connector socket 134 and charging port light 132 of charging port 130, front light bar 122, rear light bar 162, etc.

In certain embodiments, one or more ECUs 420 may include the necessary interfaces to be coupled directly to particular sensors, I/O devices, actuators and other vehicle system components. For example, Body Control Module (BCM) ECU 430 may be directly connected to charging port light 132, front light bar 122 and rear light bar 162, Battery Management System (BMS) ECU 440 may be directly connected to charging connector socket 134, etc.

Control system 400 may include Central Gateway Module (CGM) ECU 450 which provides a central communications hub for electric vehicle 100. CGM ECU 450 includes (or is coupled to) I/O interfaces 452 to receive data, send commands, etc., to and from the sensors, I/O devices, actuators and other vehicle system components. CGM ECU 450 also includes (or is coupled to) network interface(s) 454 that provides network connectivity through ECU Bus (or CAN) ports, Local Interconnect Network (LIN) ports, Ethernet ports, etc.

For example, CGM ECU 450 may receive data from sensors, I/O devices, ECUs 420, etc., and then communicate the data over ECU Bus 410 to the appropriate ECU 420. Similarly, CGM ECU 450 may receive commands and data from the ECUs 420 and send them to the appropriate I/O devices, actuators and vehicle components. Additionally, CGM ECU 450 may also serve as a master control over the different vehicle modes (e.g., road driving mode, parked mode, off-roading mode, tow mode, camping mode), and thereby control certain vehicle components related to placing the vehicle in one of the vehicle modes.

Control system 400 may include Telematics Control Module (TCM) ECU 460 which provides a vehicle communication gateway for electric vehicle 100. TCM ECU 460 may include (or may be coupled to) Bluetooth transceiver 462, WiFi transceiver 464, GPS receiver 466, etc.

In certain embodiments, WiFi transceiver 464 is an IEEE 802.11 (WiFi) transceiver, and TCM ECU 460 communicates with EV charging station control system 210 over an IEEE 802.11 (WiFi) wireless communications link. In other words, EV charging station control system 210 may establish a communication link with WiFi transceiver 464 of electric vehicle 100 (and vice versa). Similarly, in other certain embodiments, EV charging station control system 210 may establish a communication link with Bluetooth transceiver 462 of electric vehicle 100 (and vice versa).

In certain embodiments, WiFi transceiver 464 receives the charge status light pattern data from EV charging station control system 210, and TCM ECU 460 provides the charge status light pattern data to BCM EDU 430 over ECU Bus 410. As discussed above, the charge status light pattern data may define the cycling, pulsating, growing and fading, flashing, blinking, etc., of one or more charge status lights on electric vehicle 100, such as charging port light 132, front light bar 122, rear light bar 162, etc.

In certain embodiments, GPS receiver 466 receives and decodes the wireless GPS signals from the constellation of GPS satellites, including a wireless time signal, and then generates and provides the synchronization time signal discussed above to BCM EDU 430 over ECU Bus 410.

In certain embodiments, BCM EDU 430 controls the operation of the charge status lights on electric vehicle 100 based on the synchronization time signal and the charge status light pattern data received from TCM EDU 460. It should be noted that front light bar 122 and rear light bar 162 may provide other functionality in addition to charge status lighting, such as daytime running lighting, security system lighting, hazard lighting, etc.

In certain embodiments, control system 400 may also include, inter alia, Autonomy Control Module (ACM) ECU, Autonomous Safety Module (ASM) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS) ECU, Vehicle Dynamics Module (VDM) ECU, Winch Control Module (WCM) ECU, Experience Management Module (XMM) ECU, etc.

Figure 5:
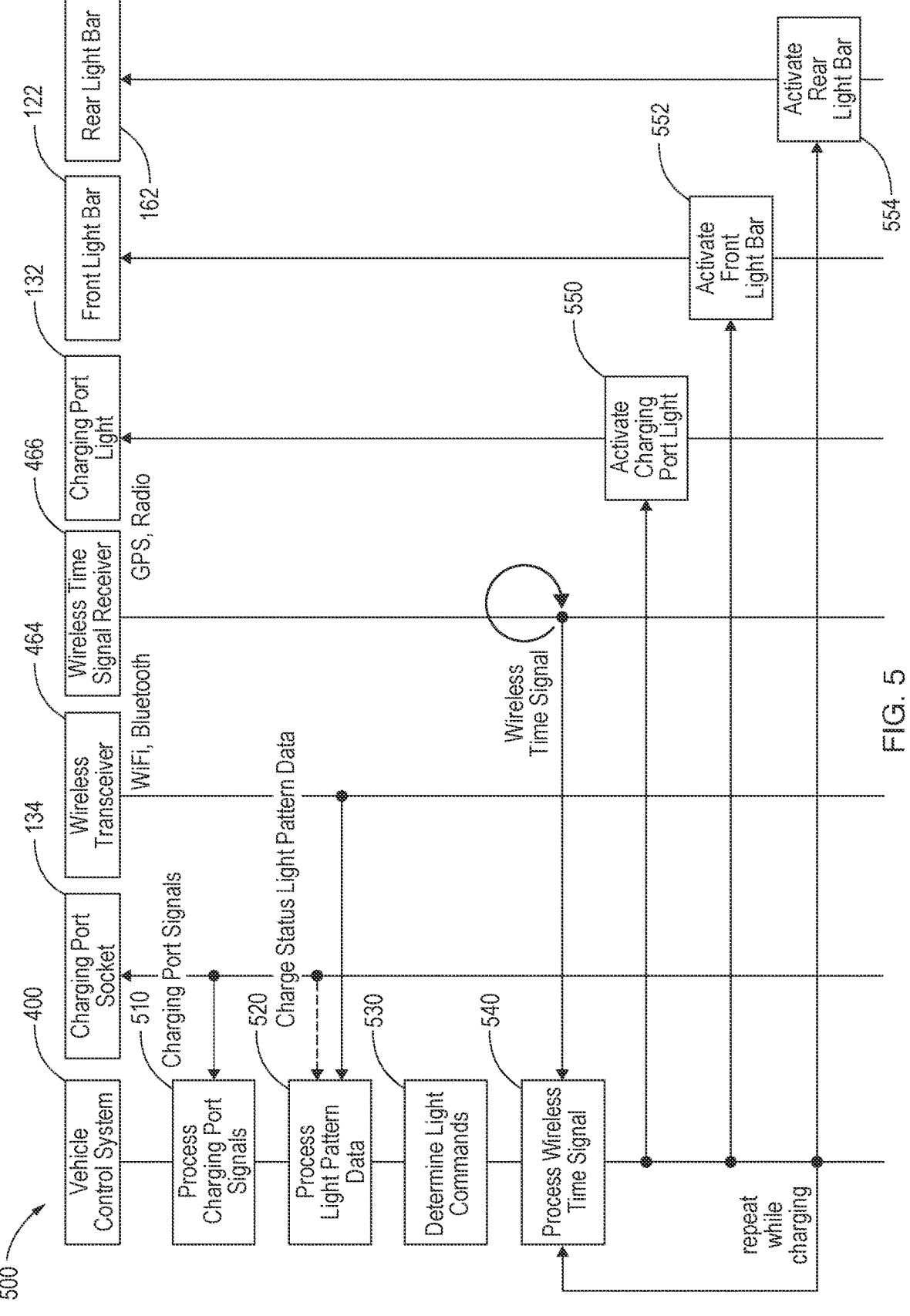
FIG. 5 presents a sequence diagram for synchronizing charge status lights of an electric vehicle, in accordance with embodiments of the present disclosure.

FIG. 5 presents a sequence diagram 500 for synchronizing charge status lights of electric vehicles 100 with EV charging stations 220, in accordance with embodiments of the present disclosure.

Generally, sequence diagram 500 depicts control system 400 as well as the components that may be relevant to the charge status lights of electric vehicle 100, including charging connector socket 134, wireless (WiFi) transceiver 464, wireless time signal (GPS) receiver 466, charging port light 132, front light bar 122, and rear light bar 162.

In certain embodiments, data and signals received by control system 400 may include a charging port signal, charge status light pattern data, and a wireless time signal, while the operations performed by control system 400 may include, inter alia, process charging port signal operation 510, process light pattern data operation 520, determine light commands operation 530, process wireless time signal operation 540, activate charging port light operation 550, activate front light bar operation 552, and activate rear light bar operation 554.

To begin the charging process, electric vehicle 100 is coupled to EV charging station 220 by plugging in EV charge connector 224 to charging port 130. More particularly, when EV charging connector plug 226 of EV charge connector 224 is connected to charging connector socket 134 of charging port 130, one or more charging port signals are exchanged between BMS EDU 440 and EV charging station 220 over the proximity pilot and control pilot signal lines of EV charge connector 224. In certain embodiments, BMS ECU 440 processes these charging port signals at operation 510.

EV charging station 220 then sends a message to EV charging station control system 210, e.g., over LAN 212 or WLAN 214, indicating that electric vehicle 100 is plugged in and ready to be charged. In response, EV charging station control system 210 sends a reply to EV charging station 220 that includes, inter alia, a command to begin charging electric vehicle 100 and charge status light pattern data. EV charging station 220 processes the charge status light pattern data, begins charging electric vehicle 100, and then waits for an initial synchronization time signal from EV charging station control system 210.

After the initial synchronization time signal is received from EV charging station control system 210, EV charging station 220 controls the operation of charge status light 222 based on the charge status light pattern data every time a synchronization time signal is received from EV charging station control system 210. In certain embodiments discussed above, EV charging station 220 may include a GPS receiver, and may generate the synchronization time signal, based on the GPS time signal, to control the operation of charge status light 222 based on the charge status light pattern data.

Also in response to receiving the message indicating that electric vehicle 100 is plugged in and ready to be charged, EV charging station control system 210 establishes a communication link with electric vehicle 100 over a wireless connection (such as a WiFi connection with WiFi transceiver 464 or a Bluetooth connection with Bluetooth transceiver 462) or a wired connection (such as the control pilot signal line of EV charge connector 224). EV charging station control system 210 then transmits, over the communication link, the charge status light pattern data to electric vehicle 100.

In certain embodiments, TCU EDU 460 processes the charge status light pattern data received over the WiFi or Bluetooth connection, and sends the charge status light pattern data to BCM ECU 430 at operation 520. In other certain embodiments, BMS ECU 440 processes the charge status light pattern data received over the control pilot signal line of EV charge connector 224, and sends the charge status light pattern data to BCM ECU 430 at operation 520.

BCM ECU 430 then determines, based on the charge status light pattern data, the proper commands to activate charging port light 132, front light bar 122, and rear light bar 162 at operation 530. In certain embodiments, BCM ECU 430 determines an activation sequence for charging port light 132 based on the charge status light pattern data, an activation sequence for front light bar 122 based on the charge status light pattern data, and an activation sequence for rear light bar 162 based on the charge status light pattern data. These activation sequences may include duration, intensity, etc. (as discussed above), and may be the same (or different) depending on the type of LED lights used in charging port light 132, front light bar 122, and rear light bar 162. BCM ECU 430 then waits for an initial synchronization time signal from TCU EDU 460.

Generally, TCU EDU 460 receives a GPS time signal from GPS receiver 466, generates a synchronization time signal based on the GPS time signal, and sends the synchronization time signal to various ECUs 420, including BCM ECU 430, at operation 540. The synchronization time signal may provide a general time reference signal for control system 400, and, as such, may be sent to various ECUs 420 for other purposes.

After the initial synchronization time signal is received from TCU EDU 460, BCM ECU 430 generally controls the operation of the charge status lights based on the charge status light pattern data every time a synchronization time signal is received from TCU EDU 460. More particularly, BCM ECU 430 activates charging port light 132 based on the charging port light activation sequence at operation 550, activates front light bar 122 based on the front light bar activation sequence at operation 552, and activates rear light bar 162 based on the rear light bar activation sequence at operation 554. Generally, BCM ECU 430 controls the operation of the charge status lights until the charging process is completed.

FIG. 6 depicts flow chart 600 representing functionality associated with synchronizing charge status lights, in accordance with embodiments of the present disclosure.

At 610, a communication link between EV charging station control system 210 and an electric vehicle 100 coupled to an EV charging station 220 is established. For example, EV charging station control system 210 may establish a communication link with electric vehicle 100 over a wireless connection (such as a WiFi connection with WiFi transceiver 464 or a Bluetooth connection with Bluetooth transceiver 462) or a wired connection (such as the control pilot signal line of EV charge connector 224).

At 620, a charge status light pattern is received, at electric vehicle 100, from EV charging station control system 210. The charge status light pattern is configured to control operation of one or more charge status lights on the electric vehicle 100 (such as charging port light 132, front light bar 122, rear light bar 162, etc.) and one or more charge status lights on the EV charging station (such as charge status light 222, etc.).

At 630, a wireless time signal is received at electric vehicle 100. The wireless time signal may be received by a global navigation satellite system receiver (such as a GPS receiver), a time standard radio transmission receiver, etc. As described above, TCU EDU 460 may receive a GPS time signal from GPS receiver 466.

At 640, a synchronization time signal is generated, by electric vehicle 100, based on the wireless time signal. As described above, TCU EDU 460 may generate a synchronization time signal based on the GPS time signal, and send the synchronization time signal to various ECUs 420, including BCM ECU 430.

At 650, operation of the charge status lights on the electric vehicle 100 is controlled based on the synchronization time signal and the charge status light pattern. As described above, BCM ECU 430 generally controls the operation of the charge status lights based on the charge status light pattern data every time a synchronization time signal is received from TCU EDU 460.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for synchronizing charge status lights, the method comprising:
   establishing a communication link between a charging station control system and an electric vehicle coupled to a charging station;
   receiving, from the charging station control system, a charge status light pattern configured to control operation of one or more charge status lights on the electric vehicle and one or more charge status lights on the charging station;

receiving a wireless time signal;

generating a synchronization time signal based on the wireless time signal; and controlling, based on the synchronization time signal and the charge status light pattern, synchronized operation of the charge status lights on the electric vehicle with charge status lights on other electric vehicles communicatively linked to the charging station control system, wherein the synchronization time signal is a repeating signal that causes the charge status lights on the electric vehicle and the other electric vehicles to repeatedly display the charge status light pattern at the same points in time.

2. The method of claim 1, wherein the communication link comprises a wireless communication link between the electric vehicle and the charging station control system.

3. The method of claim 1, wherein the communication link comprises a wired communication link between the electric vehicle, the charging station and the charging station control system.

4. The method of claim 1, wherein the charge status light pattern comprises a time period and a plurality of light intensity levels.

5. The method of claim 4, wherein the time period comprises a plurality of time steps, and the light intensity levels comprise at least two different light intensity levels.

6. The method of claim 5, wherein the charge status light pattern defines a rhythm or a cadence.

7. The method of claim 1, wherein the wireless time signal is a global positioning system (GPS) time signal.

8. A method for synchronizing charge status lights, the method comprising:

receiving, from a charging station control system, a charge status light pattern configured to control operation of at least one charge status light on a plurality of charging stations and at least one charge status light on a plurality of electric vehicles coupled to the plurality of charging stations; and controlling, based on a synchronization time signal and the charge status light pattern, synchronized operation of the at least one charge status light on each charging station, wherein the synchronization time signal is based on a wireless time signal, and wherein the synchronization time signal is a repeating signal that causes the charge status lights on each charging station to repeatedly display the charge status light pattern at the same points in time.

9. The method of claim 8, wherein the wireless time signal comprises a GPS signal.

10. The method of claim 9, further comprising:

receiving, at each charging station, the synchronization time signal from the charging station control system, wherein the charging station control system receives the wireless time signal and generates the synchronization time signal based on the wireless time signal.

11. The method of claim 9, further comprising:

receiving, at each charging station, the wireless time signal; and generating, at each charging station, the synchronization time signal based on the wireless time signal.

12. The method of claim 8, wherein the charge status light pattern comprises a time period and a plurality of light intensity levels.

13. The method of claim 12, wherein the time period comprises a plurality of time steps, and the light intensity levels comprise at least two different light intensity levels.

14. The method of claim 13, wherein the charge status light pattern defines a rhythm or a cadence.

15. A method for synchronizing charge status lights, the method comprising:

establishing communication links between a charging station control system and a plurality of electric vehicles, each electric vehicle coupled to a charging station;

transmitting, from the charging station control system, a charge status light pattern configured to control operation of one or more charge status lights on the electric vehicles and one or more charge status lights on the charging stations; and controlling, based on a synchronization time signal and the charge status light pattern, synchronized operation of the charge status lights on the electric vehicles and the charging stations, wherein the synchronization time signal is based on a wireless time signal, and wherein the synchronization time signal is a repeating signal that causes the charge status lights on the electric vehicles and the charging stations to repeatedly display the charge status light pattern at the same points in time.

16. The method of claim 15, wherein the communication links comprise wireless communication links between the charging station control system and the electric vehicles.

17. The method of claim 15, wherein the charge status light pattern comprises a time period and a plurality of light intensity levels.

18. The method of claim 17, wherein the time period comprises a plurality of time steps, and the light intensity levels comprise at least two different light intensity levels.

19. The method of claim 18, wherein the charge status light pattern defines a rhythm or a cadence.

20. The method of claim 15, wherein the wireless time signal is a global positioning system (GPS) time signal.

* * * * *